United States Patent
Farrugia et al.

(10) Patent No.: US 8,434,061 B2
(45) Date of Patent: Apr. 30, 2013

(54) SYSTEM AND METHOD FOR ARRAY OBFUSCATION

(75) Inventors: Augustin J. Farrugia, Cupertino, CA (US); Julien Lerouge, Santa Clara, CA (US); Tanya Michelle Lattner, San Jose, CA (US); Gideon M. Myles, San Jose, CA (US); Gianpaolo Fasoli, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 1011 days.

(21) Appl. No.: 12/135,032

(22) Filed: Jun. 6, 2008

(65) Prior Publication Data

US 2009/0307657 A1    Dec. 10, 2009

(51) Int. Cl.
*G06F 9/44* (2006.01)

(52) U.S. Cl.
USPC .......................................................... 717/110

(58) Field of Classification Search .................. None
See application file for complete search history.

(56) References Cited

U.S. PATENT DOCUMENTS

| | | | |
|---|---|---|---|
| 6,668,325 B1 | 12/2003 | Collberg | |
| 2003/0142163 A1* | 7/2003 | Nakayama et al. | 347/19 |
| 2006/0187834 A1* | 8/2006 | Nichols et al. | 370/230 |
| 2007/0250815 A1* | 10/2007 | Bendapudi et al. | 717/124 |

OTHER PUBLICATIONS

Drape, Stephen, "Obfuscation of Abstract Data-Types", Published 2004, St. John's College, University of Oxford—Thesis submitted for the degree of Doctor of Philosophy, 187 pages.*

Gupta, Sonali. "Code Obfuscation" published Aug. 2005. http://palizine.plynt.com/issues/2005Aug/code-obfuscation/.*

C. Collberg, C. Thomborson and D. Low, "A Taxonomy of Obfuscating Transformations," Technical Report #148, Department of Computer Science, University of Auckland, Jul. 1997.

* cited by examiner

*Primary Examiner* — Wei Zhen
*Assistant Examiner* — Adam R Banes
(74) *Attorney, Agent, or Firm* — Novak Druce Connolly Bove + Quigg LLP (57) ABSTRACT

Disclosed herein are systems, methods, and computer readable-media for obfuscating array contents in a first array, the method comprising dividing the first array into a plurality of secondary arrays having a combined total size equal to or greater than the first array, expanding each respective array in the plurality of the secondary arrays by a respective multiple M to generate a plurality of expanded arrays, and arranging data elements within each of the plurality of expanded arrays such that a data element located at an index I in a respective secondary array is located at an index I*M, wherein M is the respective multiple M in an associated expanded array, wherein data in the first array is obfuscated in the plurality of expanded arrays. One aspect further splits one or more of the secondary arrays by dividing individual data elements in a plurality of sub-arrays. The split sub-arrays may contain more data elements than the respective secondary array. The principles herein may be applied to single dimensional or multi-dimensional arrays. The obfuscated array contents may be accessed via an index to the first array which is translated to retrieve data elements stored in the plurality of expanded arrays.

27 Claims, 5 Drawing Sheets

SYSTEM AND METHOD FOR ARRAY OBFUSCATION

BACKGROUND OF THE INVENTION

1. Field of the Invention

The present invention relates to data storage and more specifically to data obfuscation.

2. Introduction

Computer software is first written as source code which is readable by a person trained to understand programming languages. Generally that source code is then compiled to object code that contains a list of instructions controlling what a computer does. Unfortunately for commercial software vendors who wish to enforce licensing or Digital Rights Management (DRM) provisions, malicious or mischievous individuals with enough time and resources can reverse engineer critical portions of the object code. One technique to reverse engineer object code is to load the executable into memory and examine the memory contents with a piece of software called a debugger to locate the critical portions of software enforcing the restrictions. Once the proper portions of object code are located and reverse engineered, the software may be modified to perform in a manner not anticipated by the software vendor, potentially bypassing DRM or licensing restrictions, but also potentially causing great harm or injury.

In addition to protecting executable instructions compiled from source code, a content provider may want to protect data from being copied or played without authorization, but still want the content to be accessible where there is authorization. DRM and software protection schemes in general work by means of security through obscurity, security by design, encryption, and other methods. Even a blend of these approaches is often insufficient to keep out a determined "hacker" or "cracker". Accordingly, what is needed in the art is an improved way to store data in a computer while making the data difficult to access without proper authorization.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods, and computer readable-media for obfuscating array contents in a first array, the method comprising dividing the first array into a plurality of secondary arrays having a combined total size equal to or greater than the first array, expanding each respective array in the plurality of the secondary arrays by a respective multiple M to generate a plurality of expanded arrays, and arranging data elements within each of the plurality of expanded arrays such that a data element located at an index I in a respective secondary array is located at an index I*M, wherein M is the respective multiple M in an associated expanded array, wherein data in the first array is obfuscated in the plurality of expanded arrays. One aspect further splits one or more of the secondary arrays by dividing individual data elements in a plurality of sub-arrays. The split sub-arrays may contain more data elements than the respective secondary array. The principles herein may be applied to single dimensional or multi-dimensional arrays. The obfuscated array contents may be accessed via an index to the first array which is translated to retrieve data elements stored in the plurality of expanded arrays.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
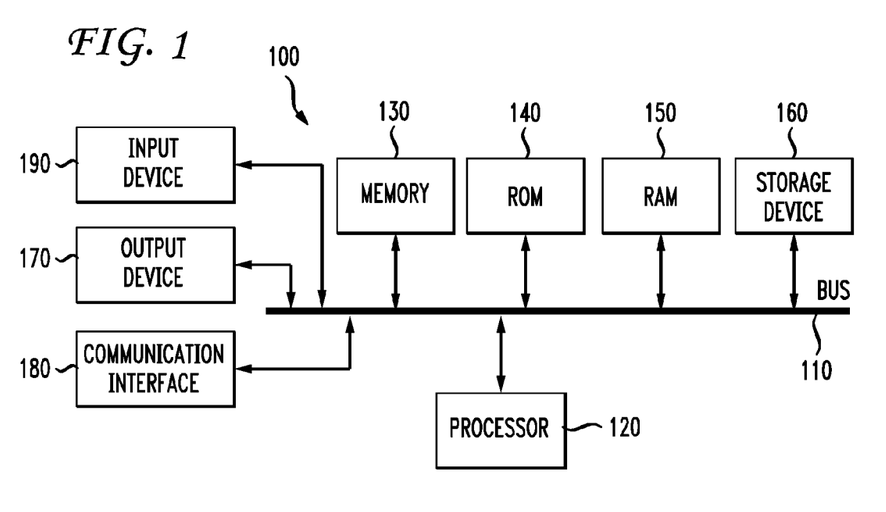
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

One of skill in the art will understand that in computer programming, an array is a data structure holding a group of data elements accessible through an index. An array may be fixed-size or static, meaning the array size is set at the creation of the array and cannot expand or shrink thereafter, or an array may be dynamic, meaning that the size of the array can be changed. Typically, an array contains a group of like data elements, or at least data elements of the same size. If a programmer has need for 10 integers, a fixed-size array named NUMBERS can be created to hold all 10; a sample line of code to create such an array is "int NUMBERS[10];". Each individual data element in the array is accessible via an index when the array is called; sample code to access the first data element is NUMBERS [0], the second data element is NUMBERS[1], the third data element is NUMBERS[2], etc. In the popular C and C++ programming languages, as well as many other languages, array elements are accessed starting at the number zero. In most programming languages, arrays are stored in a computer as contiguous memory. For example, assume storing an integer requires 32 bits of memory. A ten element array of integers requires 10*32 or 320 bits. Because the array is stored contiguously in one large block, when the second data element NUMBERS[1] is requested, the computer starts at the memory address of NUMBERS[0] and offsets or skips forward 32 bits to start reading the memory storing the second data element. For the third data element, the computer skips forward another 32 bits and so on.

The NUMBERS example above is a single dimensional array. Multidimensional arrays also exist and are structured and behave in a similar way. A sample line of code to create a two dimensional array of integers is "int NUMBERS2D[10][10];". A two dimensional array is conceptually an array of arrays. Three and higher dimensional arrays exist and are commonly used in programming. The principles described herein may be applied to multidimensional and single dimensional arrays.

Figure 2A:
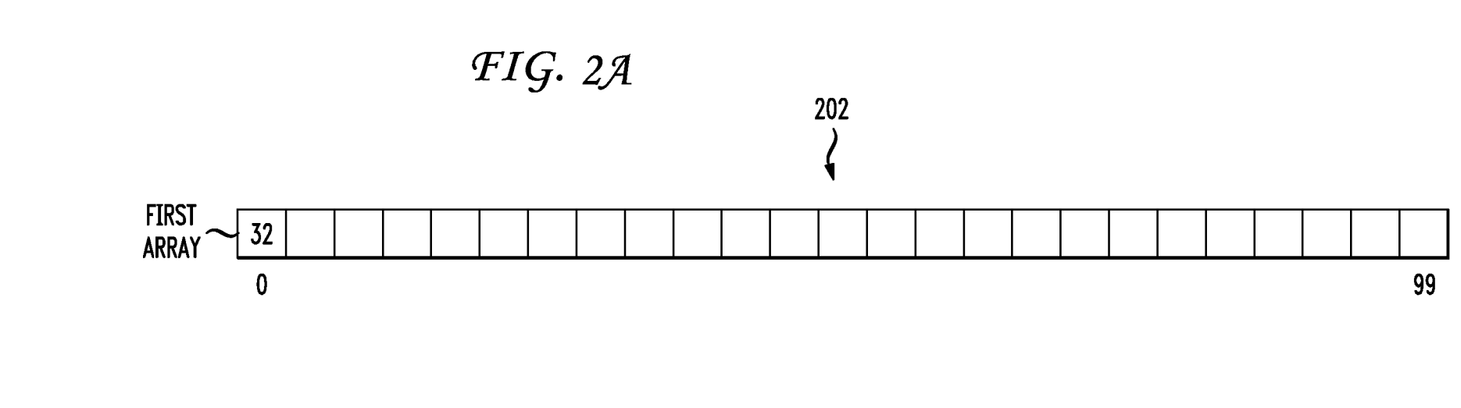
FIG. 2a illustrates a first array.

FIG. 2a illustrates a first array. The first array 202 is a fixed-size array containing one hundred 32-bit data elements indexed from 0 to 99. The first array may store any type of information which may be represented digitally and any size of data element, limited only by the computer hardware it is represented in. Passwords, Social Security numbers, user names, bank account numbers, and the like are all examples of information which may be stored in such an array.

Figure 2B:
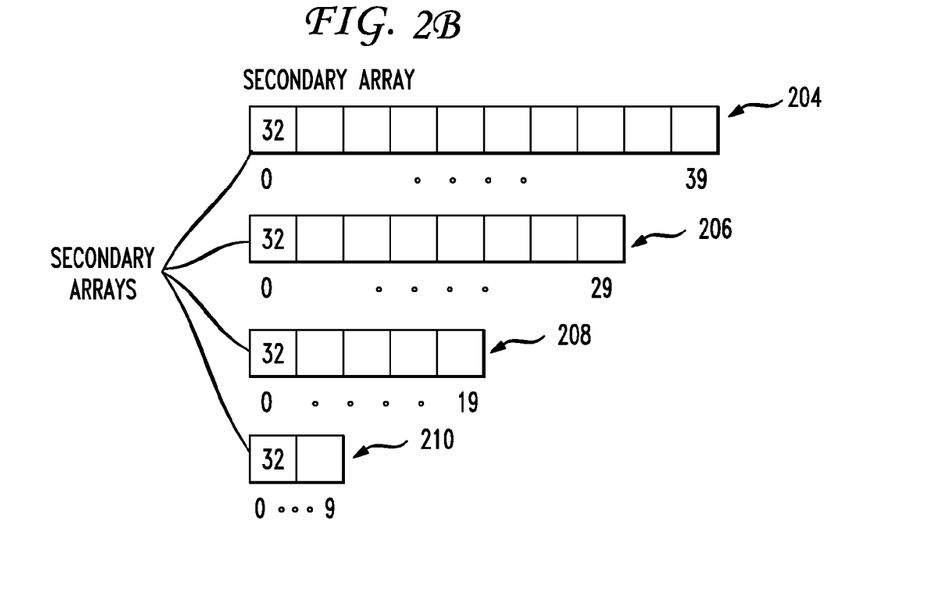
FIG. 2b illustrates secondary arrays.

FIG. 2b illustrates secondary arrays based on the first array 202. The first array 202 is divided into a first secondary array 204 of 40 data elements, a second secondary array 206 of 30 elements, a third secondary array 208 of 20 elements, and a fourth secondary array 210 of 10 data elements, thereby obfuscating the contents of the first array 202 by distributing the contents into multiple arrays and multiple memory locations. The total combined size of the secondary arrays must be equal to or greater than the size of the first array so that each data element of the first array can be represented by a data element in one of the secondary arrays. FIG. 2b is just an example of one possible way to divide the first array 202 into secondary arrays. An extreme way to divide the first array creates fifty secondary arrays, each having only two data elements.

Figure 2C:
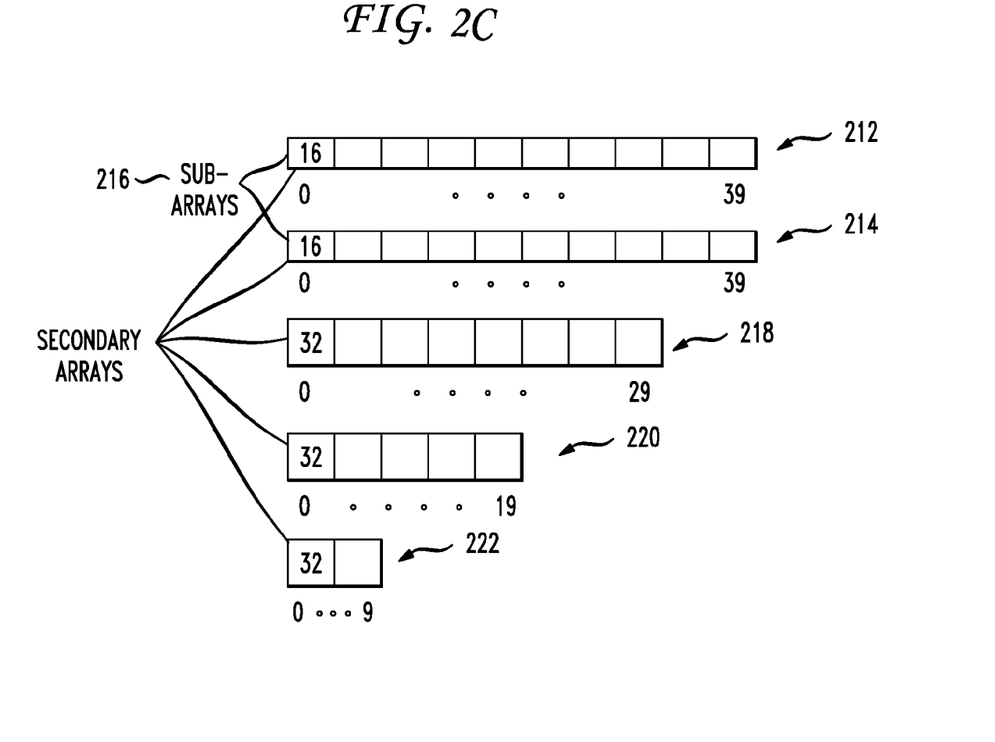
FIG. 2c illustrates sub-arrays and secondary arrays.

FIG. 2c illustrates secondary arrays and sub-arrays based on one or more secondary array. An optional step is to further obfuscate the data elements by further dividing the first secondary array 204 into sub-arrays 216. Conceptually, the array data elements are sliced horizontally down the middle, with the top half of each 32-bit data element going into a 16-bit sub-array 212 and the bottom half of each 32-bit data element going into a 16-bit sub-array 214. The sub-arrays shown are half-height to emphasize that each contains a fraction of each data element from the secondary array 204. While the illustrated sub-arrays are divided into two sub-arrays and divided equally, the number of sub-arrays per secondary array can be as many as there are bits in a stored data element. For example, the top secondary array 204 contains 32-bit data elements, so it may be divided up into as many as 32 sub-arrays. In typical usage, the number of data element bits will be evenly divisible by the number of sub-arrays. For example, a 32-bit data element is evenly divisible by 2, 4, 8, 16, and 32, so any of those numbers of sub-arrays is a typical selection for the quantity of sub-arrays. Such typical usages should not be considered limiting of the invention.

Figure 2D:
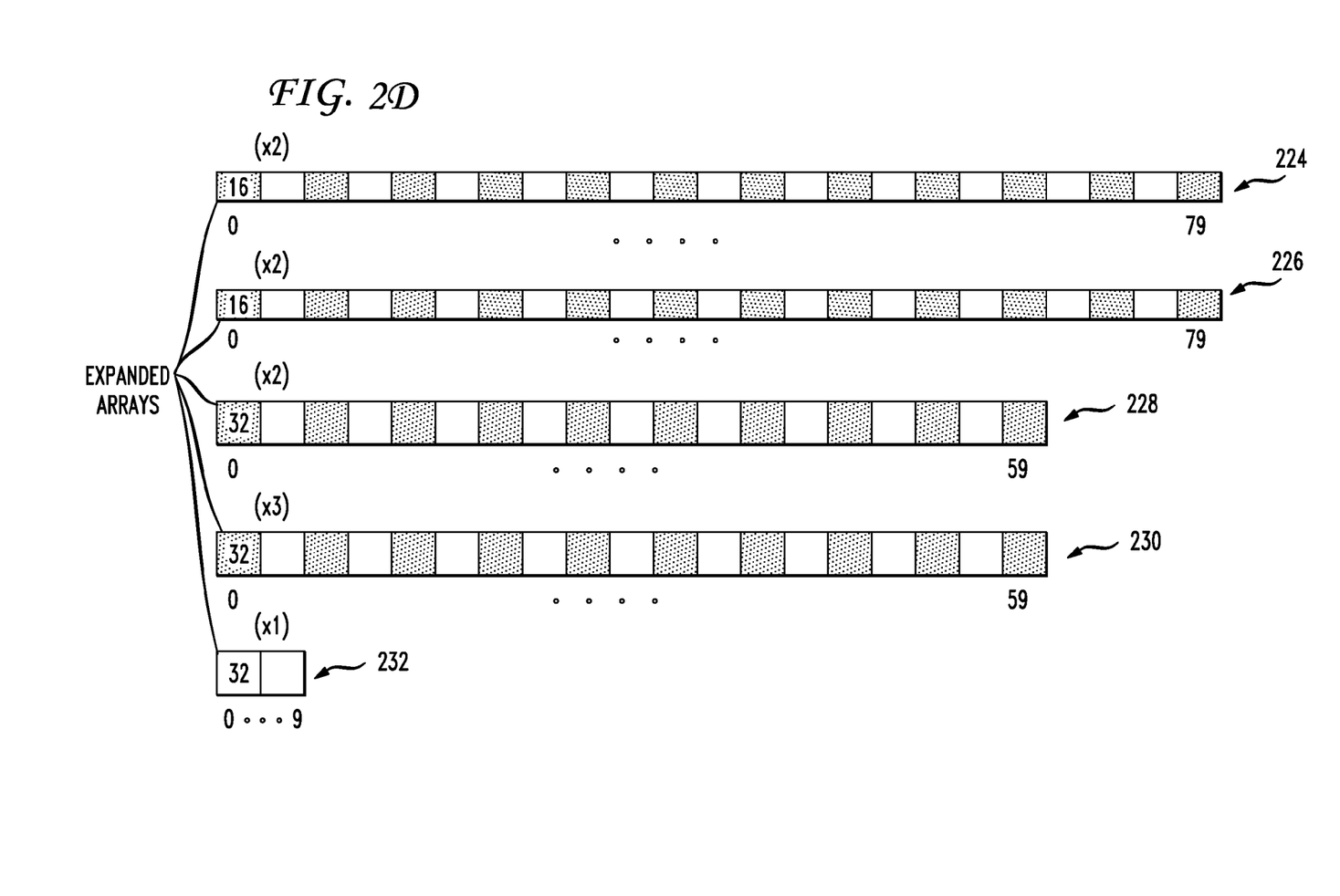
FIG. 2d illustrates expanded arrays.

FIG. 2d illustrates expanded arrays. Shaded portions indicate data elements that were not present in the secondary or sub-arrays. FIG. 2d. The secondary arrays and any sub-arrays are expanded by an arbitrary multiple. Each secondary array or sub-array may be expanded using a different or unique multiple. In the example shown, both sub-arrays 224, 226 are expanded by a multiple of 2. While the illustration shows both sub-arrays as having the same multiple, they may be expanded using different multiples, for example 3 and 7. Secondary array 228 is also expanded by a multiple of 2. Secondary array 230 is expanded by a multiple of 3. Secondary array 232 is expanded by a multiple of 1, meaning it is essentially unchanged. Data elements in each of the expanded arrays is arranged or spaced out such that a data element located at an index I in a respective secondary array is located at an index I*M, wherein M is the respective multiple in an associated expanded array. So, for example, data at index 4 in a secondary array that was expanded by a multiple of 2 would be located at position 4*2, or 8, in the expanded array. Data at index 4 in a secondary array that was expanded by a multiple of 3 would be located at position 4*3, or 12, in the expanded array. Spacing the data elements with a multiple larger than 1 pads the array with unused storage space (bits) which can be set to an initial value (such as 0), can be allowed to remain in the state it was when the memory was allocated by the computer to store the array, can be set to random values, or can be used to store other information.

In an obfuscation context where the intent is to frustrate attempts to reverse engineer software by a memory dump, padding the empty space with all 0s or all 1s or with some other recurring pattern could give clues as to how and where the data elements are stored. Consequently, padding in this way may be undesirable. Storing other data or instructions associated with programs not part of the array generating program in the padded or unused space may also be advantageous to reduce a software application's memory footprint. A password or other sensitive data may be spread among unused portions of one or more expanded arrays. Any other data or program instructions may be stored in one or more unused portion of one or more expanded array. Another type of data which may be stored is "dummy" data as opposed to the real data from the first array. "Dummy" data appears similar to the real data elements stored in an expanded array, but is unused or does not represent meaningful information. Convincing "dummy" data may be duplicate portions of the real data or it may be generated in a way to appear to be a continuation of the real data. "Dummy" data may be generated based on a statistical or other analysis of the real data. "Dummy" data generation may be semi-random. Even a clever reverse engineer is less likely to detect the boundaries between "dummy" data and real data in this manner.

In one aspect, data is stored in one or more unused portion of one or more expanded array. The information stored may be similar to data stored in the first array to throw off potential reverse engineering attempts. Further, additional secondary arrays may be introduced which contain data similar to data in the first array. The information stored may be actively used or accessed by any process or program to give the appearance of normal software operation and obfuscate the boundaries and contents of the arrays' true contents. Such additional arrays may also store active software instructions or frequently accessed information to hide the contents of the original first array.

Thereby the original data elements stored in the first array 202 are obfuscated by first being split into multiple secondary arrays of arbitrary lengths which may be stored in different memory locations; second, optionally splitting secondary arrays further into sub-arrays; and third, expanding the secondary and/or sub-arrays by an arbitrary multiple which may be unique to each secondary and/or sub-array. The original information is stored and accessible, but is less vulnerable to a reverse engineering attempt because it is shuffled, split, and stored in multiple arrays of lengths unknown to a person attempting to reverse engineer the obfuscated array.

Figure 3:
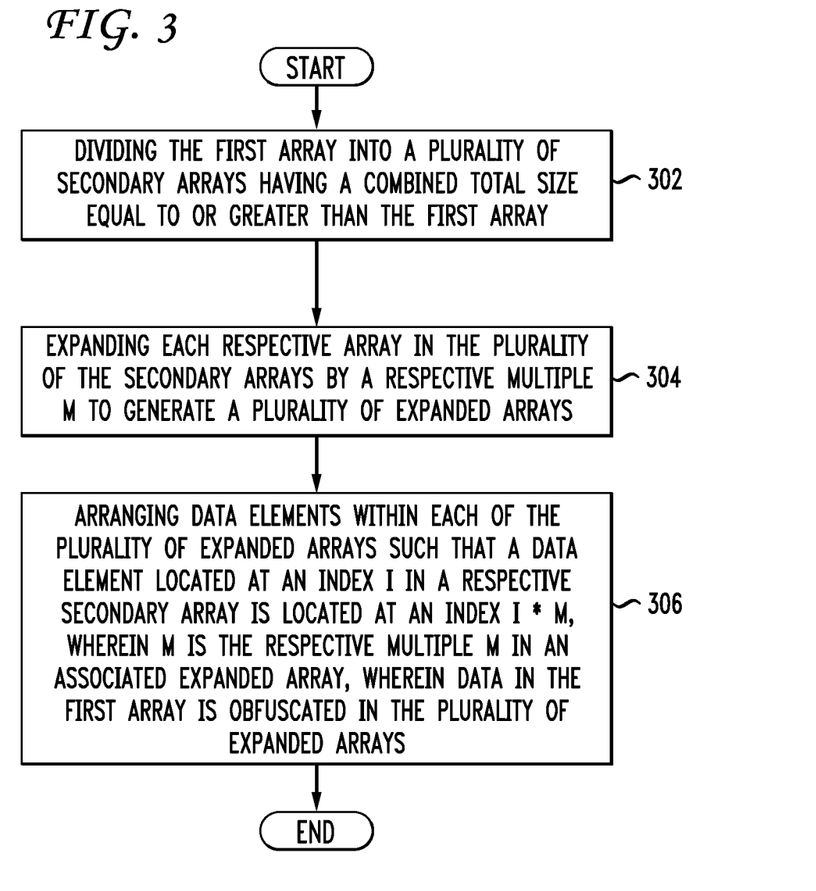
FIG. 3 illustrates an example method embodiment.

FIG. 3 illustrates an example method embodiment for obfuscating array contents in a first array. The first array may be either single dimensional or multi-dimensional. First, the method divides the first array into a plurality of secondary arrays having a combined total size equal to or greater than the first array (302). The combined total of the secondary arrays must be at least equal in size to the first array because the secondary arrays store the same information as the first array. Larger arrays are acceptable because portions of the first array can be stored in the secondary arrays with space left over.

Second, the method expands each respective array in the plurality of the secondary arrays by a respective multiple M to generate a plurality of expanded arrays (304). The multiple M is arbitrary and may differ for each secondary array or sub-array. For example, a first secondary array is expanded by a multiple of 5, a second secondary array is expanded by a multiple of 2, a third secondary array is expanded by a multiple of 6, etc. Because expanding arrays in this manner may occupy more memory, selection of multiples may take in to account excess memory usage and select smaller multiples in situations where limited memory space is an issue.

Individual data elements in the secondary arrays may be further divided into a plurality of sub-arrays. Data elements may be of any type. The sub-arrays take slices of each of the data elements. In one example, a secondary array storing 32-bit data elements is sliced into two sub-arrays, each having 16 bits. The first sub-array contains the "top" 16 bits of each data element and the second sub-array contains the "bottom" 16 bits of each data element. In another example of how to slice a 32-bit data element, a secondary array is sliced into three sub-arrays of unequal sizes. The first sub-array contains the "top" 4 bits of each data element, the second sub-array contains the "middle" 24 bits of each data element, and the third sub-array contains the "bottom" 4 bits of each data element.

Sub-arrays may contain equal or more data elements than the respective secondary array. For example, a secondary array storing 10 32-bit data elements may be divided into a sub-array of 11 16-bit data elements and a sub-array of 20 16-bit data elements. In this example, each of the 16-bit sub-arrays may contain 10 or more data elements because the source secondary array contains 10 data elements.

Third, the method arranges data elements within each of the plurality of expanded arrays such that a data element located at an index I in a respective secondary array is located at an index I*M, wherein M is the respective multiple M in an associated expanded array, wherein data in the first array is obfuscated in the plurality of expanded arrays (306). In one aspect, the plurality of expanded arrays is accessed via an index to the first array which is translated to retrieve data elements stored in the plurality of expanded arrays and/or sub-arrays. Effectively, instead of calling an index in the first array directly, such as NUMBER[5], a programmer uses a function which translates the array index to the respective location(s) in the expanded arrays to retrieve the split-up portions of the data, such as "DE_OBFUSCATE_ARRAY (NUMBER, 5);".

In one embodiment, the array obfuscation technique is hardcoded at compile time and provided to an end-user in a non-modifiable way as machine code. Providing the source to an end-user would allow for increased ease of reverse engineering the software. In one aspect, sensitive or critical portions of an executable file are obfuscated to hinder attempts to reverse engineer the executable by traditional methods. The array obfuscation techniques described herein may be used to obfuscate program instructions or other data such as passwords, IDs, Social Security numbers, digital audio files, etc. which the programmers intend to grant access to end users through authorized channels, if at all. The techniques described herein may be used in conjunction with encryption techniques generally known in the art or yet to be developed. Checksums, Hamming code, cyclic redundancy checks or similar data integrity measures known in the art or yet to be developed may be used to verify accurate retrieval of information stored in an obfuscated array. The array obfuscation techniques described herein may be applied to obfuscate data or program instructions stored in RAM, NVRAM, ROM, on a hard drive, solid state drive, optical drive, or any other computer readable medium.

In one embodiment, access to obfuscated data is granted after a user pays a fee. For example, a computer program may be given away for free with limited functionality such as an expiration date, but which obfuscates instructions allowing access to the entire functionality. The user pays a fee to obtain an activation code or similar mechanism which allows access to obfuscated data, enabling additional functionality of the software. Layers of functionality or widely varying functionality may be made accessible for different prices and/or different users while still using the same computer program.

While no obfuscation technique will prevent someone determined to reverse engineer software or other data, the goal is to make the reverse engineering process so painful and/or slow that the potential payoff is not perceived as worth the effort. Therefore, this obfuscation technique may be combined with other hardware and/or software obfuscation techniques or techniques designed to prevent data tampering or unauthorized access. Array obfuscation may be more effective in combination with other data protection schemes.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the processes described herein may have application in any system intended to be difficult to reverse-engineer. Those skilled in the art will readily recognize various modifications and changes that may be made to the present invention without following the example embodiments and applications illustrated and described herein, and without departing from the true spirit and scope of the present invention.

We claim:

1. A method of obfuscating array contents in a first array contained in a program, the method comprising:
    dividing the first array into a plurality of secondary arrays having a combined total size equal to or greater than the first array;
    generating a plurality of expanded arrays, each expanded array in the plurality of expanded arrays corresponding to a respective secondary array in the plurality of secondary arrays and having a size equivalent to an expansion by a respective multiple of M of the respective secondary array, wherein M is greater than 1; and
    assigning data elements to each of the plurality of expanded arrays from a respective secondary array such that a data element located at an index I in the respective secondary array is located at an index I*M, wherein M is the respective multiple M in an associated expanded array.

2. The method of claim 1, the method further comprising:
    prior to expanding, splitting one or more of the secondary arrays by dividing individual data elements in a plurality of sub-arrays to generate a plurality of split secondary arrays, and
    expanding each of the split secondary arrays in the plurality of split secondary arrays and any remaining secondary arrays in the plurality of secondary arrays.

3. The method of claim 2, wherein each of the plurality of sub-arrays contains at least the number of data elements as the respective secondary array.

4. The method of claim 1, wherein the first array is either single dimensional or multidimensional.

5. The method of claim 1, wherein the plurality of expanded arrays is accessed via an index to the first array which is translated to retrieve data elements stored in the plurality of expanded arrays.

6. The method of claim 1, the method further comprising storing other data in one or more unused portion of one or more expanded array.

7. The method of claim 6, wherein other data is dummy data of a same type as data stored in the first array.

8. The method of claim 1, the method further comprising introducing additional secondary arrays containing dummy data of a same type as data stored in the first array.

9. The method of claim 1, the method further comprising introducing additional secondary arrays containing active data other than data in the first array, wherein the active data is data used by the program and of a same type as data stored in the first array.

10. A system for obfuscating array contents in a first array contained in a program, the system comprising:
a processor;
a first module configured to control the processor to divide the first array into a plurality of secondary arrays having a combined total size equal to or greater than the first array;
a second module configured to control the processor to generate a plurality of expanded arrays, each expanded array in the plurality of expanded arrays corresponding to a respective secondary array in the plurality of secondary arrays and having a size equivalent to an expansion by a respective multiple of M of the respective secondary array, wherein M is greater than 1; and
a third module configured to control the processor to assign data elements to each of the plurality of expanded arrays from a respective secondary array such that a data element located at an index I in the respective secondary array is located at an index I*M, wherein M is the respective multiple M in an associated expanded array.

11. The system of claim 10, the system further comprising:
prior to expanding, splitting one or more of the secondary arrays by dividing individual data elements in a plurality of sub-arrays to generate a plurality of split secondary arrays, and
expanding each of the split secondary arrays in the plurality of split secondary arrays and any remaining secondary arrays in the plurality of secondary arrays.

12. The system of claim 11, wherein each of the plurality of sub-arrays contains at least the number of data elements as the respective secondary array.

13. The system of claim 10, wherein the first array is either single dimensional or multidimensional.

14. The system of claim 10, wherein the plurality of expanded arrays is accessed via an index to the first array which is translated to retrieve data elements stored in the plurality of expanded arrays.

15. The system of claim 10, the system further comprising a fourth module configured to control the processor to store other data in one or more unused portion of one or more expanded array.

16. The system of claim 15, wherein other data is dummy data of a same type as data stored in the first array.

17. The system of claim 10, the system further comprising a fourth module configured to control the processor to introduce additional secondary arrays containing dummy data of a same type as data stored in the first array.

18. The system of claim 10, the system further comprising a fourth module configured to control the processor to introduce additional secondary arrays containing active data other than data in the first array, wherein active data is data used by the program and of a same type as data stored in the first array.

19. A non-transitory computer-readable medium storing a computer program having instructions for obfuscating array contents in a first array contained in a program, the instructions comprising:
dividing the first array into a plurality of secondary arrays having a combined total size equal to or greater than the first array;
generating a plurality of expanded arrays, each expanded array in the plurality of expanded arrays corresponding to a respective secondary array in the plurality of secondary arrays and having a size equivalent to an expansion by a respective multiple of M of the respective secondary array, wherein M is greater than 1; and
assigning data elements to each of the plurality of expanded arrays from a respective secondary array such that a data element located at an index I in the respective secondary array is located at an index I*M, wherein M is the respective multiple M in an associated expanded array.

20. The non-transitory computer-readable medium of claim 19, the instructions further comprising:
prior to expanding, splitting one or more of the secondary arrays by dividing individual data elements in a plurality of sub-arrays to generate a plurality of split secondary arrays, and
expanding each of the split secondary arrays in the plurality of split secondary arrays and any remaining secondary arrays in the plurality of secondary arrays.

21. The non-transitory computer-readable medium of claim 19, wherein each of the plurality of sub-arrays contains at least the number of data elements as the respective secondary array.

22. The non-transitory computer-readable medium of claim 21, wherein the first array is either single dimensional or multi-dimensional.

23. The non-transitory computer-readable medium of claim 19, wherein the plurality of expanded arrays is accessed via an index to the first array which is translated to retrieve data elements stored in the plurality of expanded arrays.

24. The non-transitory computer-readable medium of claim 19, the instructions further comprising storing other data in one or more unused portion of one or more expanded array.

25. The non-transitory computer-readable medium of claim 24, wherein other data is dummy data of a same type as data stored in the first array.

26. The non-transitory computer-readable medium of claim 19, the instructions further comprising introducing additional secondary arrays containing dummy data of a same type as data stored in the first array.

27. The non-transitory computer-readable medium of claim 19, the instructions further comprising introducing additional secondary arrays containing active data other than data in the first array, wherein the active data is used by the program and of a same type as data stored in the first array.

* * * * *